US008956727B2

(12) United States Patent
Poppe et al.

(10) Patent No.: US 8,956,727 B2
(45) Date of Patent: Feb. 17, 2015

(54) COATING COMPOSITIONS AND RESULTANT COATINGS WITH HIGH SCRATCH RESISTANCE AND STABILITY TO SOLVENT POPPING

(75) Inventors: Andreas Poppe, Shanghai (CN); Joachim Woltering, Münster (DE); Beate Gebauer, Münster (DE); Alfred König, Telgte (DE); Simone Jurczik, Senden (DE)

(73) Assignee: BASF Coatings GmbH, Munster (DE)

( * ) Notice: Subject to any disclaimer, the term of this patent is extended or adjusted under 35 U.S.C. 154(b) by 223 days.

(21) Appl. No.: 13/376,330

(22) PCT Filed: Mar. 8, 2010

(86) PCT No.: PCT/EP2010/001421
§ 371 (c)(1),
(2), (4) Date: Jan. 16, 2012

(87) PCT Pub. No.: WO2010/139375
PCT Pub. Date: Dec. 9, 2010

(65) Prior Publication Data
US 2012/0189858 A1    Jul. 26, 2012

(30) Foreign Application Priority Data
Jun. 6, 2009    (DE) .......................... 10 2009 024 103

(51) Int. Cl.
*B32B 27/40* (2006.01)
*C09D 133/14* (2006.01)
(52) U.S. Cl.
USPC ..... 428/423.1; 428/447; 427/379; 427/407.1; 524/502; 525/440.03; 528/21
(58) Field of Classification Search
USPC .................... 428/423.1, 447; 427/379, 407.1; 524/502; 525/440.03; 528/21
See application file for complete search history.

(56) References Cited

U.S. PATENT DOCUMENTS

| 4,515,933 | A * | 5/1985 | Chang ............................... 528/57 |
| 6,458,463 | B1 * | 10/2002 | Yoshioka et al. ............. 428/450 |
| 2006/0046068 | A1 * | 3/2006 | Barancyk et al. .......... 428/423.1 |
| 2011/0059251 | A1 * | 3/2011 | Poppe et al. ................... 427/379 |
| 2011/0245406 | A1 * | 10/2011 | Klein et al. ................... 524/538 |

FOREIGN PATENT DOCUMENTS

| DE | 41 32 430 A1 | 4/1993 |
| WO | WO-2007/003826 A1 | 3/2007 |

OTHER PUBLICATIONS

International Search Report (in German with English Translation) and Written Opinion (in German) for PCT/EP2010/001421, mailed Jul. 2, 2010; ISA/EP.

* cited by examiner

*Primary Examiner* — Thao T. Tran
(74) *Attorney, Agent, or Firm* — Quinn Law Group, PLLC

(57) ABSTRACT

The invention provides coating compositions comprising
at least one compound (A) containing hydroxyl groups,
at least one compound (B) containing isocyanate groups,
at least 5.0% by weight, based on the nonvolatile constituents of the
coating composition, of at least one amino resin (C), wherein
the coating composition comprises at least one unsaturated, cyclic, sterically hindered amine (D) and
the coating composition contains less than 2.5 mol % of hydrolyzable silane groups, based on the sum of hydroxyl groups, isocyanate groups, and hydrolyzable silane groups.
The invention additionally relates to multistage coating processes using these coating compositions and also to the use of the coating compositions as clearcoat material and to the use of the coating process for automotive OEM finishing and automotive refinish.

20 Claims, No Drawings

_US 8,956,727 B2_

COATING COMPOSITIONS AND RESULTANT COATINGS WITH HIGH SCRATCH RESISTANCE AND STABILITY TO SOLVENT POPPING

This application is a 371 U.S. National Stage of International Application No. PCT/EP2010/001421, filed Mar. 8, 2010, which claims the benefit of German Patent Application No. DE 10 2009 024 103.5, filed Jun. 6, 2009, the disclosures of both of these applications being incorporated herein by reference.

The present invention relates to coating compositions comprising at least one compound (A) containing hydroxyl groups, at least one compound (B) containing isocyanate groups, and at least 5.0% by weight, based on the nonvolatile constituents of the coating composition, of at least one amino resin (C).

The invention further relates to multistage coating processes using these coating compositions, and also to the use of the coating compositions as clearcoat material and to the use of the coating process for automotive OEM finishing and automotive refinish.

EP 991 729 B1 describes coating compositions of the type specified at the outset that can be cured to give a haze-free, bright, and acid-resistant clearcoat. The coating compositions described therein comprise as their catalyst customary acid catalysts, such as phosphoric acid, acidic organophosphates or, more particularly, aromatic sulfonic acids, for example, which are used preferably in blocked form, blocked with amine, for example.

A disadvantage when using complex mixtures of this kind is that frequently a comparatively high catalyst concentration is necessary in order to achieve the desired profile of properties. The catalysts employed, however, often act unselectively on the individual, component crosslinking reactions, instead simultaneously influencing the various reactions, e.g., melamine condensation reactions and isocyanate addition reactions. This can lead to defects in the context of application, as for example to a tendency toward solvent popping. Furthermore, with the coating compositions described therein, it is also possible for incompatibilities to be induced in the spray mist.

Coating compositions which comprise hydroxyl-containing compounds, isocyanato-containing compounds, and amino resins are also known from EP 1 171 356 B1 or from the international patent applications WO 01/09261, WO 01/09260, WO 01/09259 or WO 01/09231. The catalyst used for the thermal crosslinking is an alcoholic solution of phenyl phosphate in alcoholic solution. These coating compositions are prepared preferably as two-component systems, where one component comprises the hydroxyl-containing compounds and, where appropriate, the amino resin, and the other component comprises the isocyanato-containing compounds. These coating compositions yield coatings which are hard, abrasion-resistant, scratch-resistant, and acid-resistant, and also, as clearcoats, are of high gloss and clear.

However, owing to the high reactivity of the isocyanato-containing compounds with respect to alcohols, the alcoholic solution of the acidic phenyl phosphate can be added only to the binder component, and this may, however, increase its reactivity to such an extent that its stability in storage is detrimentally affected. Moreover, the coating compositions often have a pot life which proves in practice to be too short, resulting in logistical and technical problems in the painting operation. Not least this can also lead to unacceptable coating outcomes.

Where amino resins are used, furthermore, the combination of the various crosslinking mechanisms may also result in a multiplicity of different reactions with mutual effects on one another and this, in certain circumstances, may result in a deterioration in certain properties. DE 10 2005 045 150.0 A1 discloses coating compositions of the type specified at the outset that comprise as their catalyst phosphonic diesters and diphosphonic diesters. Since these catalysts are comparatively weak acids, they have to be added in disproportionately large quantities. When working with such high concentrations, the complexity of formulations of this kind—particularly in the context of multicoat paint systems—leads to unwanted effects in the context of the coating operation. More particularly, the occurrence of solvent popping as a function of the layer thickness of the substrate, or the occurrence of solvent popping as a result of the influence of spray mist settling beforehand or afterward, is a phenomenon which may occur relatively often in such systems.

Finally, the patent application DE 10 2007 061 855.9-43, which has not yet been laid open, discloses coating compositions which comprise at least one hydroxyl-containing compound, at least one isocyanato-containing compound, at least one phosphorus-containing catalyst, and at least one bicyclic amine, with one or more constituents of the coating composition, preferably the isocyanato-containing compounds, containing hydrolyzable silane groups in an amount of 2.5 to 97.5 mol %, based in each case on the sum of hydroxyl groups, isocyanate groups and hydrolyzable silane groups. As a result of the modification of at least one constituent of the coating composition, more particularly of the isocyanato-containing compounds, with silanes, the resultant coatings exhibit very good scratch resistance.

Problem

The problem on which the present invention is based, therefore, is that of providing coating compositions, more particularly for the clearcoat in automotive OEM finishes and in automotive refinishes, which lead to coatings having a high scratch resistance in conjunction with good acid resistance and at the same time a very good overall appearance.

More particularly, the occurrence of solvent popping in dependence on the layer thickness of the substrate, and the occurrence of solvent popping as a result of the influence of spray mist settling beforehand or afterward, are to be avoided.

Solution

In the light of the stated problem identified above, coating compositions have been found comprising at least one compound (A) containing hydroxyl groups, at least one compound (B) containing isocyanate groups, at least 5.0% by weight, based on the nonvolatile constituents of the coating composition, of at least one amino resin (C), the coating compositions comprising at least one unsaturated, cyclic, sterically hindered amine (D) and the coating compositions containing less than 2.5 mol % of hydrolyzable silane groups, based on the sum of hydroxyl groups, isocyanate groups, and hydrolyzable silane groups.

The invention also relates to multistage coating processes using these coating compositions, and also to the use of the coating compositions as clearcoat material, and the use of the coating process for automotive OEM finishing and automotive refinish.

In the light of the prior art it was surprising and unforeseeable for the skilled worker that the problem on which the present is based could be solved by means of the coating composition of the invention. Thus it is surprising more particularly that, through the addition of at least one unsaturated, cyclic, sterically hindered amine, it was possible to prevent the occurrence of solvent popping in dependence on the layer thickness of the substrate, and also the occurrence of solvent popping as a result of the influence of spray mist settling beforehand or afterward, without the addition of these amines having any negative influence on the other properties of the resultant coatings, such as more particularly the acid resistance, the scratch resistance, and the overall appearance. Consequently, it is possible for the coatings and paint systems of the invention, more particularly the clearcoats, to be employed in the technologically and esthetically particularly demanding field of automotive OEM finishing.

Lastly it is possible for the coating compositions of the invention to be prepared with particular ease and with very good reproducibility, and on paint application they do not give rise to any significant toxicological or environmental problems.

DESCRIPTION OF THE INVENTION

The Coating Composition of the Invention

A feature of the coating composition of the invention is that it contains less than 2.5 mol %, more particularly less than 1 mol % and with very particular preference less than 0.5 mol %, of hydrolyzable silane groups, based in each case on the sum of hydroxyl groups, isocyanate groups, and hydrolyzable silane groups.

Hydrolyzable silane groups here are typically groups which contain moisture-hydrolyzable radicals attached to silicon. The hydrolyzable silane groups may be, for example, halogen radicals, more particularly chlorine and bromine, which are attached to silicon, or may be alkoxy groups, alkylcarbonyl groups, and acyloxy groups that are attached to silicon. Particularly preferred hydrolyzable silane groups are alkoxysilane groups Si(OR').

More particularly the coating composition contains less than 2.5 mol %, in particular less than 1 mol %, and very preferably less than 0.5 mol %, based on the sum of hydroxyl groups, isocyanate groups, and structural units (I), of structural units of the formula (I)

$$—X—Si—R''_xG_{3-x} \qquad (I)$$

where

G=identical or different hydrolyzable groups,

X=organic radical, more particularly linear and/or branched alkylene or cycloalkylene radical having 1 to 20 carbon atoms, very preferably X=alkylene radical having 1 to 4 carbon atoms, R''=alkyl, cycloalkyl, aryl or aralkyl, it being possible for the carbon chain to be interrupted by nonadjacent oxygen, sulfur or NRa groups, where Ra=alkyl, cycloalkyl, aryl or aralkyl, preferably R''=alkyl radical, more particularly having 1 to 6 C atoms, x=0 to 2, preferably 0 to 1, more preferably x=0.

The hydrolyzable groups G may be selected from the group of the halogens, more particularly chlorine and bromine, from the group of the alkoxy groups, from the group of the alkylcarbonyl groups, and from the group of the acyloxy groups. Particular preference is given to alkoxy groups (OR').

The respective preferred alkoxy radicals (OR') may be identical or different, but what is critical for the structure of the radicals is to what extent they influence the reactivity of the hydrolyzable silane groups. Preferably R' is an alkyl radical, more particularly having 1 to 6 C atoms. Particular preference is given to radicals R' which increase the reactivity of the silane groups, in other words represent good leaving groups. Hence a methoxy radical is preferred over an ethoxy radical, which is preferred in turn over a propoxy radical. With particular preference, therefore, R'=ethyl and/or methyl, more particularly methyl.

The Hydroxyl-Containing Compounds (A)

Hydroxyl-containing compounds (A) used are preferably low molecular weight polyols and also oligomeric and/or polymeric polyols.

As low molecular weight polyols use is made, for example, of diols, such as preferably ethylene glycol, neopentylglycol, 1,2-propanediol, 2,2-dimethyl-1,3-propanediol,1,4-butanediol, 1,3-butanediol, 1,5-pentanediol, 2,2,4-trimethyl-1,3-pentanediol, 1,6-hexanediol, 1,4-cyclohexanedimethanol, and 1,2-cyclohexanedimethanol, and also polyols, such as preferably trimethylolethane, trimethylolpropane, trimethylolhexane, 1,2,4-butanetriol, pentaerythritol, and dipentaerythritol.

Low molecular weight polyols of this kind are admixed preferably in minor proportions to the oligomeric and/or polymeric polyol component (A).

The preferred oligomeric and/or polymeric polyols (A) have mass-average molecular weights Mw>500 daltons, measured by means of GPC (gel permeation chromatography), preferably between 800 and 100 000 daltons, more particularly between 1000 and 50 000 daltons. Particular preference is given to polyester polyols, polyurethane polyols, polysiloxane polyols, and more particularly polyacrylate polyols and/or polymethacrylate polyols and also their copolymers, referred to below as polyacrylate polyols.

The polyols preferably have an OH number of 30 to 400 mg KOH/g, more particularly between 100 and 300 mg KOH/g.

The glass transition temperatures, measured by DSC (Differential Thermal Analysis), of the polyols are preferably between −150 and 100° C., more preferably between −120° C. and 80° C.

Suitable polyester polyols are described for example in EP-A-0 994 117 and EP-A-1 273 640. Polyurethane polyols are prepared preferably by reaction of polyester polyol prepolymers with suitable di- or polyisocyanates, and are described for example in EP-A-1 273 640.

Suitable polysiloxane polyols are described for example in WO-A-01/09260, where the polysiloxane polyols recited therein may be employed preferably in combination with further polyols, more particularly those having relatively high glass transition temperatures.

The polyacrylate polyols that are especially preferred in accordance with the invention are generally copolymers and preferably have mass-average molecular weights Mw between 1000 and 20 000 daltons, particularly between 1500 and 10 000 daltons, measured in each case by gel permeation chromatography (GPC) against a polystyrene standard.

The glass transition temperature of the copolymers is generally between −100 and 100° C., more particularly between −50 and 80° C. (measured by means of DSC).

The polyacrylate polyols preferably have an OH number of 60 to 300 mg KOH/g, more particularly between 100 and 250 mg KOH/g, very preferably between 150 and 190 mg KOH/g. The hydroxyl number (OH number) indicates how many mg of potassium hydroxide are equivalent to the amount of acetic acid bound in acetylation by 1 g of substance. For the determination, the sample is boiled with acetic anhydride-pyridine and the resultant acid is titrated with potassium hydroxide solution (DIN 53240-2).

The polyacrylate polyols preferably have an acid number between 0 and 30 mg KOH/g. This acid number indicates the number of mg of potassium hydroxide consumed in neutralizing 1 g of the respective compound of component (b) (DIN EN ISO 2114).

The properties of the coating cured to completion can also be influenced through the selection of the hydroxyl-containing binders. Generally speaking, as the OH number of component (A) goes up, there is an increase in the scratch resistance of the resultant coating. However, the OH number ought also not to be selected to be too high, since otherwise it is not possible for complete crosslinking to take place.

Hydroxyl-containing monomer units used are preferably hydroxyalkyl acrylates and/or hydroxyalkyl methacrylates, such as, more particularly, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, and also, more particularly, 4-hydroxybutyl acrylate and/or 4-hydroxybutyl methacrylate.

Further monomer units used for the polyacrylate polyols are preferably alkyl acrylates and/or alkyl methacrylates, such as, preferably, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, amyl acrylate, amyl methacrylate, hexyl acrylate, hexyl methacrylate, ethylhexyl acrylate, ethylhexyl methacrylate, 3,3,5-trimethylhexyl acrylate, 3,3,5-trimethylhexyl methacrylate, stearyl acrylate, stearyl methacrylate, lauryl acrylate or lauryl methacrylate, cycloalkyl acrylates and/or cycloalkyl methacrylates, such as cyclopentyl acrylate, cyclopentyl methacrylate, isobornyl acrylate, isobornyl methacrylate or, more particularly, cyclohexyl acrylate and/or cyclohexyl methacrylate.

As further monomer units for the polyacrylate polyols it is possible to use vinylaromatic hydrocarbons, such as vinyltoluene, alpha-methylstyrene or, more particularly, styrene, amides or nitriles of acrylic or methacrylic acid, vinyl esters or vinyl ethers, and also, in minor amounts, more particularly, acrylic and/or methacrylic acid.

As binders (BM) it is preferred to use (meth)acrylate copolymers which are obtainable by copolymerizing (a1) 10% to 80% by weight, preferably 20% to 60% by weight, of 3-hydroxypropyl acrylate or 3-hydroxypropyl methacrylate or 2-hydroxypropyl acrylate or 2-hydroxypropyl methacrylate or 2-hydroxyethyl acrylate or 2-hydroxyethyl methacrylate or 4-hydroxy-n-butyl acrylate or 4-hydroxy-n-butyl methacrylate or mixtures of these monomers, (b1) 0% to 30% by weight, preferably 0% to 15% by weight, of a non-(a1) hydroxy-containing ester of acrylic acid or of a hydroxyl-containing ester of methacrylic acid, or of a mixture of such monomers, (c1) 0% to 90% by weight, preferably 10% to 70% by weight, of a non-(a1) and non-(b1) aliphatic or cycloaliphatic ester of (meth)acrylic acid having at least 4 carbon atoms in the alcohol residue, or of a mixture of such monomers, (d1) 0% to 3% by weight, preferably 0.5% to 2% by weight, of an ethylenically unsaturated carboxylic acid or of a mixture of ethylenically unsaturated carboxylic acids, and (e1) 0% to 50% by weight, preferably 5% to 35% by weight, of a vinylaromatic and/or of a non-(a1), non-(b1), non-(c1), and non-(d1) ethylenically unsaturated monomer, or of a mixture of such monomers, the sum of the weight fractions of components (a1), (b1), (c1), (d1), and (e1) always being 100% by weight.

The hydroxyl-containing compounds (A) are used customarily in an amount of 20% to 70%, preferably of 30% to 65%, by weight, based in each case on the nonvolatile constituents of the coating composition.

The Isocyanato-Containing Compounds (B)

As component (B) the coating compositions of the invention comprise one or more compounds having free, i.e., non-blocked, and/or blocked isocyanate groups. The coating compositions of the invention preferably comprise compounds (B) having free isocyanate groups. Alternatively the isocyanate groups of the isocyanato-containing compounds (B) may be used in blocked form. This is preferentially the case when the coating compositions of the invention are used as one-component systems.

The isocyanato-containing compounds (B) used in accordance with the invention are preferably conventional substituted or unsubstituted aromatic, aliphatic, cycloaliphatic and/or heterocyclic diisocyanates and/or polyisocyanates. Examples of preferred diisocyanates and/or polyisocyanates are as follows: 2,4-toluene diisocyanate, 2,6-toluene diisocyanate, diphenylmethane 4,4'-diisocyanate, diphenylmethane 2,4'-diisocyanate, p-phenylene diisocyanate, biphenyl diisocyanates, 3,3'-dimethyl-4,4'-diphenylene diisocyanate, tetramethylene 1,4-diisocyanate, hexamethylene 1,6-diisocyanate, 2,2,4-trimethylhexane 1,6-diisocyanate, isophorone diisocyanate, ethylene diisocyanate, 1,12-dodecane diisocyanate, cyclobutane 1,3-diisocyanate, cyclohexane-1,3-diisocyanate, cyclohexane 1,4-diisocyanate, methylcyclohexyl diisocyanates, hexahydrotoluene 2,4-diisocyanate, hexahydrotoluene 2,6-diisocyanate, hexahydrophenylene 1,3-diisocyanate, hexahydrophenylene 1,4-diisocyanate, perhydrodiphenylmethane 2,4'-diisocyanate, 4,4'-methylenedicyclohexyl diisocyanate (e.g., Desmodur® W from Bayer AG), tetramethylxylyl diisocyanates (e.g., TMXDI® from American Cyanamid), and mixtures of the aforementioned polyisocyanates. Additionally preferred polyisocyanates are the biuret dimers and the isocyanurate trimers of the aforementioned diisocyanates.

Particularly preferred diisocyanates and/or polyisocyanates are hexamethylene 1,6-diisocyanate, isophorone diisocyanate, and 4,4'-methylenedicyclohexyl diisocyanate, their biuret dimers and/or isocyanurate trimers.

In another embodiment of the invention the diisocyanates and/or polyisocyanates are polyisocyanate prepolymers with urethane structural units, which are obtained by reacting polyols with a stoichiometric excess of aforementioned polyisocyanates. Polyisocyanate prepolymers of this kind are described, for example in U.S. Pat. No. 4,598,131.

In the isocyanato-containing compounds (B) preferably less than 2.5 mol %, more particularly less than 1 mol %, more preferably less than 0.5 mol %, and very preferably none of the isocyanate groups have been reacted with compounds of the formula (IIa)

$$HN(X-SiR''_x(OR')_{3-x})_n(X'-SiR''_y(OR')_{3-y})_m \qquad (IIa),$$

where

R'=hydrogen, alkyl or cycloalkyl, it being possible for the carbon chain to be interrupted by nonadjacent oxygen, sulfur or NRa groups, where Ra=alkyl, cycloalkyl, aryl or aralkyl, preferably R'=ethyl and/or methyl X,X'=linear and/or branched alkylene or cycloalkylene radical having 1 to 20 carbon atoms, preferably X, X'=alkylene radical having 1 to 4 carbon atoms, R"=alkyl, cycloalkyl, aryl or aralkyl, it being possible for the carbon chain to be interrupted by nonadjacent oxygen, sulfur or NRa groups, where Ra=alkyl, cycloalkyl, aryl or aralkyl, preferably R"=alkyl radical, more particularly having 1 to 6 C atoms, n=0 to 2, m=0 to 2, m+n=2, and x,y=0 to 2, and/or with compounds containing silane groups, of the formula (IIIa)

where

Z=—NH—, —NR—, —O—, where R=alkyl, cycloalkyl, aryl or aralkyl, it being possible for the carbon chain to be interrupted by nonadjacent oxygen, sulfur or NRa groups, where Ra=alkyl, cycloalkyl, aryl or aralkyl, x=0 to 2, and X, R', R" have the definition indicated for formula (IIa).

The isocyanato-containing compounds (B) are used typically in an amount of 5% to 50%, preferably of 15% to 45%, more preferably of 20% to 40%, by weight, based in each case on the nonvolatile constituents of the coating composition.

The Amino Resin (C)

It is essential to the invention that the coating composition comprises at least 5.0% by weight, based on the nonvolatile constituents of the coating composition, of at least one amino resin (C). The coating composition preferably contains 8% to 30% by weight, more preferably more than 10% to 25% by weight, based in each case on the nonvolatile constituents of the coating composition, of at least one amino resin (C).

Examples of suitable amino resins (C) are all of the amino resins commonly used in the field of the coatings industry, the properties of the resultant coating compositions being controllable via the reactivity of the amino resin. The compounds in question are condensation products of aldehydes, more particularly formaldehyde, and, for example, urea, melamine, guanamine, and benzoguanamine. The amino resins contain alcohol groups, preferably methylol groups, which in general are partly etherified, or are preferably completely etherified, with alcohols. Use is made more particularly of amino resins etherified with lower alcohols. Preference is given to using amino resins etherified with methanol and/or ethanol and/or butanol, examples being the products available commercially under the names Cymel®, Resimene®, Maprenal®, and Luwipal®, more particularly Cymel® 202, Luwipal® 018, and Setamine® US 138.

The amino resins (C) are well-established compounds and are described for example in detail in the American patent application U.S. 2005/0182189 A1, page 1, paragraph [0014], to page 4, paragraph [0028].

The Unsaturated, Cyclic, Sterically Hindered Amine (D)

It is essential to the invention that the coating composition comprises at least one unsaturated, cyclic, sterically hindered amine (D). Preferably the coating composition comprises at least one unsaturated, bicyclic, sterically hindered amine (D). With very particular preference the coating composition comprises as amine (D) 1,5-diazabicyclo[4.3.0]non-5-ene (called DBN for short) or 1,8-diazabicyclo[5.4.0]undec-7-ene (called DBU for short).

The unsaturated, cyclic, sterically hindered amine (D) is used preferably in an amount of 0.001% to 1.0% by weight, with particular preference in an amount of 0.01% to 0.5% by weight, based on the nonvolatile constituents of the coating composition.

It is indeed known from U.S. Pat. No. 5,691,439 that certain tertiary amines, such as triethylamine, for example, pyridines or saturated cyclic amines, such as diazabicyclo[2,2,2]octane, for example, catalyze the reactions of hydroxyl-containing compounds with isocyanate groups. In many cases, however, the use of such catalysts for the reactions of isocyanate groups with hydroxyl groups leads to inhibition of melamine crosslinking. Depending on the amine used, it is also possible to observe a lower conversion of the isocyanate groups than that achieved in the case, for example, of triethylamine. Such inhibition or reduction of isocyanate group conversion may have consequences including a poorer chemical resistance of the resultant surfaces.

It is known, moreover, that coating compositions which contain at least 5.0% by weight, based on the nonvolatile constituents of the coating composition, of at least one amino resin frequently exhibit an increased tendency toward solvent popping, which can be attributed more particularly to the fact that condensation products are released to a high degree.

It is therefore surprising that the inventive use of unsaturated, cyclic, sterically hindered amines (D) catalyzes the reaction of the hydroxyl groups with the isocyanate groups and that the melamine crosslinking is not inhibited. Above all, however, it is surprising that, through the inventive use of the unsaturated, cyclic, sterically hindered amines (D), the solvent popping tendency of the coatings is reduced, without detriment to the other properties such as appearance and the chemical resistance of the resultant coating films, even when the coating compositions contain at least 5.0% by weight of amino resin. More particularly the coating compositions of the invention are notable both for reduced solvent popping tendency in dependence on the layer thickness of the substrate, and for reduced solvent popping tendency as a result of the influence of spray mist which has settled beforehand or has settled afterward.

Further Catalysts (K)

The coating compositions of the invention may additionally comprise, if desired, further catalysts. More particularly the coating compositions of the invention may further comprise at least one acid-containing catalyst (K).

For example, the coating compositions of the invention may further comprise one or more sulfonic acid-based catalysts. The coating compositions of the invention may further comprise, for example, p-toluenesulfonic acid, dodecylbenzenesulfonic acid or dinonylnaphthalenesulfonic acid. As acid-containing catalysts they preferably comprise phosphoric esters and/or phosphoric acid partial esters. Generally speaking, especially when using strong acids, it is advantageous to employ the acid catalysts in blocked form, blocked with amine, for example. From this the acid can be released again thermally.

Very particular preference is given to using as catalyst (K) the corresponding amine-blocked phosphoric esters, and more particularly amine-blocked ethylhexyl phosphates and amine-blocked phenyl phosphates, with very particular preference amine-blocked bis(2-ethylhexyl)phosphate.

These acid-containing catalysts (K) are used typically in an amount of 0.01% to 6.0% by weight, preferably of 0.1% to 5.0% by weight, more preferably in fractions of 0.5% to 3.0% by weight, based in each case on the nonvolatile constituents of the coating composition.

Further Constituents of the Coating Composition and Application of the Coating Compositions The coating compositions of the invention typically further comprise at least one organic solvent. Solvents suitable for the coating compositions of the invention are more particularly those which in the coating composition are chemically inert toward the other constituents of the coating composition. Examples of such solvents are aliphatic and/or aromatic hydrocarbons such as toluene, xylene, solvent naphtha, Solvesso 100 or Hydrosol® (from ARAL), ketones, such as acetone, methyl ethyl ketone or methyl amyl ketone, esters, such as ethyl acetate, butyl acetate, pentyl acetate or ethyl ethoxypropionate, ethers, or mixtures of the aforementioned solvents.

Furthermore, the coating composition of the invention may comprise at least one customary and known coatings additive (F) in effective amounts, i.e., in amounts preferably up to 30%, more preferably up to 25%, and more particularly up to 20%, by weight, based in each case on the nonvolatile constituents of the coating composition.

Examples of suitable coatings additives are as follows:
in particular, UV absorbers;
in particular, light stabilizers such as HALS compounds, benzotriazoles or oxalanilides;
free-radical scavengers;
slip additives;
polymerization inhibitors;
defoamers;
reactive diluents, of the kind generally known from the prior art, which are preferably inert toward the —Si(OR)3 groups;
wetting agents such as siloxanes, fluorine compounds, carboxylic monoesters, phosphoric esters, polyacrylic acids and their copolymers or polyurethanes;
adhesion promoters such as tricyclodecanedimethanol;
flow control agents;
film-forming assistants such as cellulose derivatives;
fillers such as, for example, nanoparticles based on silicon dioxide, aluminum oxide or zirconium oxide; for further details refer to Römpp Lexikon "Lacke and Druckfarben" Georg Thieme Verlag, Stuttgart, 1998, pages 250 to 252;
rheology control additives, such as the additives known from patents WO 94/22968, EP-A-0 276 501, EP-A-0 249 201 or WO 97/12945; crosslinked polymeric microparticles, of the kind disclosed for example in EP-A-0 008 127; inorganic phyllosilicates such as aluminum magnesium silicates, sodium magnesium phyllosilicates and sodium magnesium fluorine lithium silicates of the montmorillonite type; silicas such as Aerosils®; or synthetic polymers with ionic and/or associative groups, such as polyvinyl alcohol, poly(meth)acrylamide, poly(meth)acrylic acid, polyvinylpyrrolidone, styrene-maleic anhydride copolymers or ethylene-maleic anhydride copolymers and their derivatives, or hydrophobically modified ethoxylated urethanes or polyacrylates;
flame retardants; and/or
the water scavengers already recited above.

In a further embodiment of the invention the coating composition of the invention may additionally comprise further pigments and/or fillers and may serve to produce pigmented topcoats. The pigments and/or fillers employed for these purposes are known to the skilled worker.

The coatings of the invention that are produced from the coating compositions of the invention adhere outstandingly even to already cured electrocoats, surfacer coats, basecoats or customary and known clearcoats, and are outstandingly suitable, besides their use in automotive OEM (production-line) finishing, for automotive refinish or for the modular scratchproofing of automobile bodies that have already been finished.

Application of the coating compositions of the invention may take place by any customary application method, such as by spraying, knifecoating, spreading, pouring, dipping, impregnating, trickling or rolling for example. At application, the substrate to be coated may itself be at rest, with the application equipment or unit being in motion. Alternatively the substrate to be coated, more particularly a coil, may be in motion, with the application unit being at rest relative to the substrate or being moved appropriately.

Preference is given to employing spray application methods, such as, for example, compressed-air spraying, airless spraying, high-speed rotation, electrostatic spray application (ESTA), where appropriate in conjunction with hot spray application such as hot air spraying, for example.

Curing of the applied coating compositions of the invention may take place after a certain rest time. The rest time serves, for example, for the flow and for the degassing of the coating films, or for the evaporation of volatile constituents such as solvents. The rest time may be supported and/or shortened through the application of elevated temperatures and/or through a reduced atmospheric humidity, provided this does not entail any instances of damage or change to the coating films, such as their premature complete crosslinking, for instance.

The thermal curing of the coating compositions has no peculiarities in terms of method, but instead takes place in accordance with the customary and known methods such as heating in a convection oven or irradiation using IR lamps. This thermal cure may also be accomplished in stages. Another preferred method of curing is a cure with near infrared (NIR radiation).

The thermal cure takes place advantageously at a temperature of 30 to 200° C., more preferably 40 to 190° C., and more particularly 50 to 180° C., for a time of 1 min up to 10 h, more preferably 2 min up to 5 h, and more particularly 3 min to 3 h; at the temperatures employed for automotive refinish, which are preferably between 30 and 90° C., it is also possible for longer cure times to be employed.

The coating compositions of the invention afford new cured coatings, especially coating systems, more particularly clearcoats, moldings, especially optical moldings, and self-supporting films, all of which are highly scratch-resistant and in particular are stable to chemicals and to weathering, and exhibit a very good overall appearance. The coatings and coating systems of the invention, especially the clearcoats, can be produced more particularly even at coat thicknesses >40 μm without stress cracks occurring.

For these reasons the coating compositions of the invention are of excellent suitability as decorative, protective and/or effect-imparting, highly scratch-resistant coatings and coating systems on bodies of means of transport (more particularly motor vehicles, such as motorcycles, buses, trucks or automobiles) or parts thereof; on buildings, both internally and externally; on furniture, windows, and doors; on plastics moldings, more particularly CDs and windows; on small industrial parts, on coils, containers, and packaging; on white goods; on films; on optical, electrical and mechanical components; and on hollow glassware and articles of everyday use.

The coating compositions and coating systems of the invention, more particularly the clearcoats, are employed in particular in the technologically and esthetically particularly demanding field of automotive OEM (production-line) finishing and also of automotive refinish. With particular preference the coating compositions of the invention are employed in multistage coating processes, more particularly in processes where a pigmented basecoat is first applied to an uncoated or precoated substrate and thereafter a coat with the coating composition of the invention is applied. The invention, accordingly, also provides multicoat color and/or effect paint systems comprising at least one pigmented basecoat and at least one clearcoat disposed thereon, wherein the clearcoat has been produced from the coating composition of the invention.

Not only water-thinnable basecoat materials but also basecoat materials based on organic solvents can be used. Suitable basecoat materials are described for example in EP-A-0 692 007 and in the documents recited therein at column 3 lines 50 et seq. The applied basecoat is preferably first dried—that is, in an evaporation phase, at least some of the organic solvent and/or water is removed from the basecoat film. Drying takes place preferably at temperatures from room temperature to 80° C. After drying, the coating composition of the invention is applied. Subsequently the two-coat finish is baked, preferably under conditions employed in the context of automotive OEM finishing, at temperatures from 30 to 200° C., more preferably 40 to 190° C. and more particularly 50 to 180° C., for a time of 1 min up to 10 h, more preferably 2 min up to 5 h, and more particularly 3 min to 3 h; at the temperatures employed for automotive refinish, which are preferably between 30 and 90° C., it is also possible for longer cure times to be employed.

The coats produced with the coating composition of the invention are notable in particular for an especially high chemical stability and weathering stability and also for very good carwash resistance and scratch resistance, and at the same time exhibit a very good overall appearance.

In another preferred embodiment of the invention the coating composition of the invention is employed as a transparent clearcoat material for coating plastics substrates, more particularly transparent plastics substrates. In this case the coating compositions include UV absorbers, which in terms of amount and type are also designed for effective UV protection of plastics substrate. Here as well, the coating compositions are notable for an outstanding combination of scratch resistance and weathering stability, in conjunction with very good appearance. The plastics substrates thus coated are used preferably as a substitute for glass components in automobile construction, the plastics substrates being composed preferably of polymethyl methacrylate or polycarbonate.

EXAMPLES

Preparation of a Polyacrylate Polyol (A1)

A reactor flushed with nitrogen and fitted with a condenser is charged with 175.0 parts by weight of pentyl acetate and this initial charge is heated to 140° C. with stirring.

In parallel with this, two separate feeds were prepared. Feed 1 consisted of 285.8 parts by weight of 2-hydroxypropyl methacrylate, 1.50 parts by weight of acrylic acid, 144.4 parts by weight of ethylhexyl methacrylate, 68.8 parts by weight of ethylhexyl acrylate, and 119.3 parts by weight of cyclohexyl methacrylate.

Feed 2 consisted of 26.0 parts by weight of solvent naphtha and 74.4 parts by weight of tert-butyl peroxy-2-ethylhexanoate (Peroxide TBPEH). When the temperature of 140° C. had been reached, feed 2 was metered in slowly and uniformly over a time of 285 minutes. 15 minutes after the start of feed 2, feed 1 was metered into the reactor slowly and uniformly over a time of 240 minutes. After the end of the metering of feed 2, the reaction mixture was stirred at 140° C. for a further 60 minutes for post-polymerization. During this time, feed 3 was made ready, consisting of 26.5 parts by weight of solvent naphtha and 6.2 parts by weight of tert-butyl peroxy-2-ethylhexanoate (Peroxide TBPEH). When the post-polymerization time had expired, the temperature was cooled to 110° C. and, after 110° C. had been reached, feed 3 was metered in uniformly over a time of 60 minutes. After the end of the metering of feed 3, the reaction mixture was stirred at 110° C. for a further 120 minutes for post-polymerization.

The solids content of the resulting product was found to be 66.0% and its acid number 6 mg KOH/g (based on the solids).

Preparation of Thixotropic Agent T1

A 5 l reactor, flushed with nitrogen and fitted with a condenser, is charged with 924.00 parts by weight of solvent naphtha and this initial charge is heated to 140° C. with stirring.

In parallel with this, two separate feeds were prepared. Feed 1 consisted of 338.10 parts by weight of styrene, 253.50 parts by weight of n-butyl methacrylate, 338.10 parts by weight of 2-hydroxypropyl methacrylate, 16.80 parts by weight of acrylic acid, 439.50 parts by weight of cyclohexyl methacrylate, and 304.20 parts by weight of 2-hydroxyethyl methacrylate. Feed 2 consisted of 60.00 parts by weight of solvent naphtha and 168.90 parts by weight of Peroxide TBPEH (tert-butyl peroxy-2-ethyl-hexanoate). When the temperature of 140° C. had been reached, feed 2 was metered in slowly and uniformly over a time of 285 minutes. 15 minutes after the start of feed 2, feed 1 was metered into the reactor slowly and uniformly over a time of 240 minutes. After the end of the metering of feed 2, the reaction mixture was stirred at 140° C. for a further 120 minutes for post-polymerization. The solids was adjusted with 179.40 g of solvent naphtha. The solids content of the resulting product was found to be 60.00%, the acid number 9.00 mg KOH/g (based on the solids), and the viscosity (at 23° C., 55% strength in solvent naphtha) 2000 mPas ($2500\ s^{-1}$) (CAP03) (DIN ISO 2884-1). The OH number was found to be 155.6 mg KOH/g.

75 parts by weight of the resultant polyacrylate polyol were diluted in 16.3 parts by weight of butyl acetate. Added to this mixture were 8.7 parts by weight of Aerosil® 380 (commercial hydrophilic silica having an average primary particle size of 7 nm and a specific BET surface area of 380 $m^2/g$, from Evonik). This was followed by the homogenization of the resultant mixture in a dissolver (VDH-1 from Vollrath, peripheral speed 8-28 m/s) at a temperature of 60° C. Finally the mixture was milled in an agitator mill (model ZWM 46, grinding media 0.6-0.8 mm, type ER 120 A, fill level 85) with an energy input of 0.18 kWh per kg of milling charge, with a maximum paste temperature of 60° C. The resulting paste was used as a rheological assistant.

Preparation of Thixotropic Agent T2

In the same way as for the preparation of the thixotropic agent T1, the thixotropic agent T2 was prepared, but with the following differences:

First of all a 65% strength solution in solvent naphtha of a polyacrylate polyol was prepared from the following monomer units: 32% by weight of n-butyl acrylate, 14% by weight of n-butyl methacrylate, 13% by weight of styrene, 20% by weight of hydroxyethyl acrylate, 20% by weight of 4-hydroxybutyl acrylate, and 1% by weight of acrylic acid.

43.8% by weight of this polyacrylate polyol solution are admixed with 11.1% by weight of Aerosil® R812 (commercial hydrophobic silica having an average primary particle size of 7 nm and a specific BET surface area of 260 m²/g, from Evonik), 21.7% by weight of xylene and 23.4% by weight of butanol, and processed in the same way as for the preparation of T1 to give a thixotropic agent T2.

Preparation of the Curing Agent

53% by weight of a 90% strength solution of a commercial hexamethylene isocyanurate (commercial product Basonat® HI190 from BASF SE), 23% by weight of a 70% strength solution of an isophorone diisocyanate isocyanurate (commercial product Desmodur® N 4470 from Bayer Material Science), 10% by weight of butyl acetate, 10% by weight of solvent naphtha, and 4% by weight of a catalyst solution (K1) are mixed.

The catalyst solution (K1) is obtained from 39.35% by weight of 2-ethylhexyl phosphate, 50% by weight of methoxypropyl acetate and 10.65% by weight of triethylamine.

Preparation and Application of the Coating Compositions of the Comparative Example C1 and of the Inventive Example 1

The binder mixture of Comparative Example C1 and the binder mixture of Inventive Example 1 were prepared by mixing the components specified in Table 1. The clearcoat material of Comparative Example C1 and the clearcoat material of Inventive Example 1 were prepared by combining 100 parts by weight of the binder mixture with the parts by weight of the curing agent that are specified in Table 2, and by stirring until a homogeneous mixture is produced.

TABLE 1

Composition of the binder mixtures of Comparative Example 1 and of Inventive Example 1 in parts by weight

|  | Comparative Example C1 | Inventive Example 1 |
|---|---|---|
| Acrylate resin A1 | 55.00 | 55.00 |
| Cymel 202[1] | 16.00 | 16.00 |
| Thix.paste T2 | 2.00 | 2.00 |
| Thix.paste T1 | 4.00 | 4.00 |
| Disperbyk 161[2] | 0.3 | 0.3 |
| Ethoxypropyl acetate | 4.03 | 4.03 |
| Tinuvin 123[3] | 0.8 | 0.8 |
| Tinuvin 384-2[4] | 1.1 | 1.1 |
| Solvent naphtha 160/180 | 3 | 3 |
| Byk 325[5] | 0.15 | 0.15 |
| GB Ester[6] | 1.5 | 1.5 |
| White spirit 145/200 | 2 | 2 |
| Butyldiglycol acetate | 3 | 3 |
| 1-Methoxypropyl acetate | 3 | 3 |
| Butylglycol acetate | 4 | 4 |
| Triethylamine | 0.8 | 0 |

TABLE 1-continued

Composition of the binder mixtures of Comparative Example 1 and of Inventive Example 1 in parts by weight

|  | Comparative Example C1 | Inventive Example 1 |
|---|---|---|
| 30% strength solution of DBN in butanol[7] | 0 | 0.2 |

Key to Table 1:
[1] commercial methoxymethylbutoxybutylmelamine resin, 82.7% strength in n-butanol, from Cytec Industries
[2] 30% strength solution in methoxypropyl acetate and butyl acetate of a commercial dispersant based on a high molecular mass block copolymer, from Byk Chemie
[3] Tinuvin ® 123, commercial light stabilizer based on a sterically hindered amine, from Ciba
[4] Tinuvin ® 384, commercial light stabilizer based on a benztriazole, from Ciba
[5] 52% strength solution of a commercial flow control agent based on a polyether-modified methylalkylpolysiloxane copolymer, from Byk Chemie
[6] butyl glycolate, commercial solvent from Helm AG
[7] 30% strength solution of DBN (1,5-diazabicyclo[4.3.0]non-5-ene) in butanol

TABLE 2

Composition of the coating compositions of Comparative Example 1 and of Inventive Example 1

|  | Comparative Example C1 | Inventive Example 1 |
|---|---|---|
| Addition of curing agent per 100 parts by weight of stock varnish | 36.1 | 36 |

The coatings were produced by applying the coating composition of Comparative Example 1 and the coating composition of Inventive Example 1, immediately after their preparation, and by spraying, to metal test panels which had each been coated with a customary and known, cathodically deposited, thermally cured electrocoat, a customary and known, thermally cured surfacer coat, and a coat, subjected to preliminary drying at 80° C. for 10 minutes, of a commercial, conventional, black basecoat material from BASF Coatings AG. The basecoat and the clearcoat were cured jointly at 140° C. for 22 minutes. The resulting basecoat had a film thickness of 7.5 μm, the resulting clearcoat a film thickness of around 35 μm.

Assessment of Spray Mist Assimilation

In order to test the robustness of the materials with regard to spray mist assimilation, the freshly applied clearcoat film, after a 2-minute flash, was is coated with further clearcoat material once again by means of spray application. The surface quality of re-misted surface was then inspected with regard to its stability to solvent popping and its spray mist sensitivity. The results are summarized in Table 3 below.

TABLE 3

Assessment of stability to solvent popping

| Sample | Spray mist popping after 2 minutes |
|---|---|
| Comparative Example C1 | Severe popping, spread over the entire test area |
| Inventive Example 1 | Extremely minimal popping, fewer and significantly smaller pops than in Comparative Example C1 |

In addition, the chemical resistance of the coatings of Comparative Example C1 and of Inventive Example 1 was additionally investigated, by means of the gradient oven method. The results are set out in Table 4.

For the determination of the chemical resistance, the above-described metal test panels (gradient oven panels from Byk-Gardner), provided with the cured coatings, are subjected to the application of drops (about 0.25 ml) of a 20% strength sulfuric acid solution by pipette from a distance of 2 cm. In a temperature gradient oven (from Byk-Gardner) they are subjected to a temperature gradient in the lengthwise direction of the panel, from 35 to 80° C., for 30 minutes. Following exposure to the substances, the substances were removed under running water and the damage was assessed visually after 24 hours. For the assessment of the resistance, the range (temperature) of first visible attack on the clearcoat is reported. The results are reported in Table 4 ("Beginning of damage after 24 h (° C.)"). After this first assessment of the damage, the test panels are stored in the convection oven at 80° C. for 2 hours, and the damage is assessed visually again. The results are reported in Table 4 ("Beginning of damage after 2 h 80° C. (° C.)").

TABLE 4

Assessement of chemical resistance

| Substance | Beginning of damage (BD) | C1 | Ex. 1 |
|---|---|---|---|
| Sulfuric acid | BD after 24 h (° C.) | 45 | 45 |
| Sulfuric acid | BD after 2 h 80° C. (° C.) | 49 | 48 |
| Aq. sodium hydroxide | BD after 24 h (° C.) | 58 | 57 |
| Aq. sodium hydroxide | BD after 2 h 80° C. (° C.) | 66 | 64 |
| Pancreatin | BD after 24 h (° C.) | 38 | 38 |
| Pancreatin | BD after 2 h 80° C. (° C.) | 62 | 66 |
| Tree resin | BD after 24 h (° C.) | 45 | 43 |
| Tree resin | BD after 2 h 80° C. (° C.) | 68 | 68 |
| Fully demineralized water | BD after 24 h (° C.) | 66 | 62 |
| Fully demineralized water | BD after 2 h 80° C. (° C.) | 66 | >75 |

The results in Table 4 show that the addition of 1,5-diazabicyclo[4.3.0]non-5-ene does not adversely affect the chemical resistance of the resulting coating.

The overall appearance was assessed following pneumatic application of the coating compositions at 2.5 bar in three spray passes to a commercial conventional solid-color black basecoat from BASF Coatings AG. Thereafter the resultant coating is flashed at room temperature for 5 minutes and then baked at 140° C. for 22 minutes. The baked coating films of Inventive Example 1 and of Comparative Example 1 were investigated using the "Wave Scan" instrument from Firma Byk-Gardner, with 1250 measurement points being recorded over a length of 10 cm. The reflection is divided by the instrument into longwave reflection ("Long Wave"=LW), i.e., the variance of the light intensity for structures in the range from 0.6 mm to 10 mm, and into shortwave reflection ("Short Wave"=SW), i.e., the variance of the light intensity for structures in the range from 0.1 mm to 0.6 mm. The results of the Wave-Scan measurements are set out in Tables 5 and 6.

TABLE 5

Profile, horizontal

| Example | Long Wave | Short Wave |
|---|---|---|
| Comparative Example C1 | 4.2 | 19 |
| Inventive Example 1 | 4.2 | 19.8 |

TABLE 6

Profile, vertical

| Example | Long Wave | Short Wave |
|---|---|---|
| Comparative Example C1 | 9.5 | 17.1 |
| Inventive Example 1 | 7.4 | 18.3 |

The results in Tables 5 and 6 show that the addition of 1,5-diazabicyclo[4.3.0]non-5-ene does not adversely affect the appearance of the resulting coating.

Preparation of the Coating Compositions and Production of the Coatings of Examples 2 and 3

In the same way as for the preparation of the binder mixture of Inventive Example 1, the binder mixtures of Inventive Examples 2 and 3 are prepared from the constituents specified in Table 7.

TABLE 7

Composition of the binder mixtures of Inventive Examples 2 and 3 in parts by weight

| | Inventive Example 2 | Inventive Example 3 |
|---|---|---|
| Acrylate resin A1 | 55.00 | 55.00 |
| Cymel 202[1)] | 16.00 | 16.00 |
| Thix.paste T2 | 2.00 | 2.00 |
| Thix.paste T1 | 4.00 | 4.00 |
| Disperbyk 161[2)] | 0.3 | 0.3 |
| Ethoxypropyl acetate | 4.03 | 4.03 |
| Tinuvin 123[3)] | 0.8 | 0.8 |
| Tinuvin 384-2[4)] | 1.1 | 1.1 |
| Solvent naphtha 160/180 | 3 | 3 |
| Byk 325[5)] | 0.15 | 0.15 |
| GB Ester[6)] | 1.5 | 1.5 |
| White spirit 145/200 | 2 | 2 |
| Butyldiglycol acetate | 3 | 3 |
| 1-Methoxypropyl acetate | 3 | 3 |
| Butylglycol acetate | 4 | 4 |
| Triethylamine | 0.8 | 0 |
| 30% strength solution of DBN in butanol[7)] | 0.2 | 0 |
| 30% strength solution of DBU in butanol[8)] | 0 | 0.2 |

Key to Table 7:
[1)]commercial methoxymethylbutoxybutylmelamine resin, 82% strength in butanol, from Cytec Industries
[2)]30% strength solution in methoxypropyl acetate and butyl acetate of a commercial dispersant based on a high molecular mass block copolymer, from Byk Chemie
[3)]Tinuvin ® 123, commercial light stabilizer based on a sterically hindered amine, from Ciba
[4)]Tinuvin ® 384, commercial light stabilizer based on a benzotriazole, from Ciba
[5)]52% strength solution of a commercial flow control agent based on a polyether-modified methylalkylpolysiloxane copolymer, from Byk Chemie
[6)]butyl glycolate, commercial solvent from Helm AG
[7)]30% strength solution of DBN (1,5-diazabicyclo[4.3.0]non-5-ene) in butanol
[8)]30% strength solution of DBU (1,8-diazabicyclo[5.4.0]undec-7-ene) in butanol In the same way as for the preparation of the coating composition of Inventive Example 1, the coating compositions of Inventive Examples 2 and 3 are prepared from the weight fractions of the curing agent that are specified in Table 8, based in each case on 100 parts by weight of binder mixture.

TABLE 8

Composition of the coating compositions of Inventive Examples 2 and 3

| | Inventive Example 2 | Inventive Example 3 |
|---|---|---|
| Addition of curing agent per 100 parts by weight of stock varnish | 36 | 36 |

In order to evaluate the catalytic activity of different amines, the conversion of the isocyanate groups was monitored as a function of the cure time at 140° C. by means of IR spectroscopy (ATR method). Here it was found that, both for Inventive Example 2 and for Inventive Example 3, the conversion of the isocyanate groups was higher than for Comparative Example C1.

Moreover, for the coating compositions of Inventive Examples 2 and 3, the spray mist assimilation was assessed visually, as described for Comparative Example C1 and Inventive Example 1. The results are set out in Table 9.

TABLE 9

Assessment of stability to solvent popping

| Sample | Spray mist popping after 2 minutes |
|---|---|
| Inventive Example 2 | Extremely minimal popping, fewer and significantly smaller pops than in Comparative Example C1, slightly better appearance than Inventive Example 1 |
| Inventive Example 3 | Extremely minimal popping, fewer and significantly smaller pops than in Comparative Example C1, slightly better appearance than Inventive Example 2 |

What is claimed is:

1. A coating composition comprising:
    at least one compound (A) containing hydroxyl groups;
    at least one compound (B) containing isocyanate groups;
    at least 5.0% by weight, based on the nonvolatile constituents of the coating composition, of at least one amino resin (C); and
    at least one unsaturated, cyclic, sterically hindered amine (D);
    wherein the coating composition is a clearcoat coating composition and contains less than 2.5 mol % of hydrolysable silane groups, based on the sum of hydroxyl groups, isocyanate groups, and hydrolyzable silane groups.

2. The coating composition as claimed in claim 1, wherein the at least one unsaturated, cyclic, sterically hindered amine (D) is a bicyclic amine.

3. The coating composition as claimed in claim 1, wherein the at least one unsaturated, cyclic, sterically hindered amine (D) is 1,5-diazabicyclo[4.3.0]non-5-ene or 1,8-diazabicyclo[5.4.0]undec-7-ene.

4. The coating composition as claimed in claim 1, wherein the coating composition contains 0.001% by weight to 1.0% by weight, based on the nonvolatile constituents of the coating composition, of the at least one unsaturated, cyclic, sterically hindered amine (D).

5. The coating composition as claimed in claim 1, wherein the coating composition contains 8% by weight to 30.0% by weight, based on the nonvolatile constituents of the coating composition, of the at least one amino resin (C).

6. The coating composition as claimed in claim 1, wherein the coating composition contains 0.1% by weight to 5.0% by weight, based on the nonvolatile constituents of the coating composition, of at least one acid-containing catalyst (K).

7. The coating composition as claimed in claim 1, wherein the coating composition contains 0.5% by weight to 3.0% by weight, based on the nonvolatile constituents of the coating composition, of at least one acid-containing catalyst (K).

8. The coating composition as claimed in claim 1, wherein the at least one compound containing hydroxyl groups (A) is at least one of a polyacrylate polyol and/or a polymethacrylate polyol and/or a polyester.

9. The coating composition as claimed in claim 8, wherein the coating composition comprises a polyacrylate polyol and/or a polymethacrylate polyol having an OH number of 60 mg KOH/g to 300 mg KOH/g.

10. The coating composition as claimed in claim 1, wherein the at least one compound (B) containing isocyanate groups is at least one of hexamethylene 1,6-diisocyanate, isophorone diisocyanate, and/or 4,4'-methylenedicyclohexyl diisocyanate, and the biuret dimers and/or isocyanurate trimers thereof.

11. The coating composition as claimed in claim 1, wherein the coating composition contains 0.01% by weight to 0.5% by weight, based on the nonvolatile constituents of the coating composition, of the at least one unsaturated, cyclic, sterically hindered amine (D).

12. The coating composition as claimed in claim 1, wherein the coating composition contains 10.0% by weight to 25% by weight, based on the nonvolatile constituents of the coating composition, of at least one amino resin.

13. The coating composition as claimed in claim 1, wherein the at least one compound (A) containing hydroxyl groups is a polyacrylate polyol and/or a polymethacrylate polyol having an OH number of 100 mg KOH/g to 250 mg KOH/g.

14. The coating composition as claimed in claim 1, wherein the at least one compound (A) containing hydroxyl groups is a polyacrylate polyol and/or a polymethacrylate polyol having an OH number of 150 mg KOH/g to 190 mg KOH/g.

15. A multi-coat effect and/or color paint system comprising at least one pigmented basecoat and at least one clearcoat film disposed thereon, wherein the clearcoat film has been produced from the coating composition as claimed in claim 1.

16. A multistage coating process comprising:
    applying, to an uncoated or precoated substrate, a pigmented basecoat; and
    after applying the pigmented basecoat, applying a film of a clearcoat coating composition, wherein the clearcoat coating composition comprises:
        at least one compound (A) containing hydroxyl groups;
        at least one compound (B) containing isocyanate groups;
        at least 5.0% by weight, based on the nonvolatile constituents of the coating composition, of at least one amino resin (C); and
        at least one unsaturated, cyclic, sterically hindered amine (D);
        wherein the clearcoat coating composition contains less than 2.5 mol % of hydrolyzable silane groups, based on the sum of hydroxyl groups, isocyanate groups, and hydrolyzable silane groups.

17. The multistage coating process as claimed in claim 16, further including, after applying the pigmented basecoat, first drying the applied pigmented basecoat at a temperature of from room temperature to 80° C.; and after applying the clearcoat coating composition, curing the clearcoat coating composition at a temperature of from 30° C. to 200° C. for a time of one minute up to 10 hours.

18. The multistage coating process as claimed in claim 16, wherein the multistage coating process is an automotive OEM finishing process or an automotive refinish process.

19. A method for improving a solvent popping stability of a coating composition that comprises:
  at least one compound (A) containing hydroxyl groups;
  at least one compound (B) containing isocyanate groups; and
  at least 5.0% by weight, based on the nonvolatile constituents of the coating composition, of at least one amino resin (C), the method comprising:
  incorporating into the coating composition an unsaturated, cyclic, sterically hindered amine (D) in an amount of from about 0.001% by weight to about 1.0% by weight.

20. The method as claimed in claim 19, wherein the unsaturated, cyclic, sterically hindered amine (D) is bicyclic.

* * * * *